(12) United States Patent
Park et al.

(10) Patent No.: US 10,707,495 B2
(45) Date of Patent: Jul. 7, 2020

(54) GAS DIFFUSION LAYER FOR METAL-AIR BATTERY, METAL-AIR BATTERY INCLUDING THE GAS DIFFUSION LAYER, AND METHOD OF MANUFACTURING THE METAL-AIR BATTERY

(71) Applicant: Samsung Electronics Co., Ltd., Suwon-si, Gyeonggi-do (KR)

(72) Inventors: Jungock Park, Youngin-si (KR); Mokwon Kim, Suwon-si (KR); Joonhee Kim, Seoul (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 121 days.

(21) Appl. No.: 15/947,997

(22) Filed: Apr. 9, 2018

(65) Prior Publication Data
US 2019/0036127 A1    Jan. 31, 2019

(30) Foreign Application Priority Data
Jul. 26, 2017   (KR) .................. 10-2017-0094966

(51) Int. Cl.
| H01M 4/88 | (2006.01) |
| H01M 12/08 | (2006.01) |
| H01M 12/06 | (2006.01) |
| H01M 4/86 | (2006.01) |
| H01M 4/96 | (2006.01) |

(Continued)

(52) U.S. Cl.
CPC ......... *H01M 4/8807* (2013.01); *H01M 4/382* (2013.01); *H01M 4/8626* (2013.01); *H01M 4/96* (2013.01); *H01M 10/0525* (2013.01); *H01M 12/06* (2013.01); *H01M 12/08* (2013.01); *H01M 2004/8689* (2013.01); *Y02E 60/128* (2013.01)

(58) Field of Classification Search
None
See application file for complete search history.

(56) References Cited

U.S. PATENT DOCUMENTS 8,580,431 B2    11/2013    Roev et al.
8,714,994 B2    5/2014    Daily et al.
(Continued)

FOREIGN PATENT DOCUMENTS

EP    2278655 A1    1/2011
EP    3316366 A1    5/2018
(Continued)

OTHER PUBLICATIONS

European Search Report for European Patent Application No. 18176472.1 dated Jan. 4, 2019.

*Primary Examiner* — Scott J. Chmielecki
(74) *Attorney, Agent, or Firm* — Cantor Colburn LLP

(57) ABSTRACT

A metal-air battery includes: at least one positive electrode layer, which is configured for using oxygen as an active material and includes a first surface and a second surface opposite the first surface; a gas diffusion layer on the first surface of the positive electrode layer and including a plurality of carbon fibers; an electrolyte layer on the second surface of the positive electrode layer; and a negative electrode metal layer on the electrolyte layer, wherein the positive electrode layer includes a plurality of grooves, and wherein portions of the plurality of carbon fibers are in the grooves.

20 Claims, 14 Drawing Sheets

(51) Int. Cl.
*H01M 4/38* (2006.01)
*H01M 10/0525* (2010.01)

(56) References Cited

U.S. PATENT DOCUMENTS

| | | | | |
|---|---|---|---|---|
| 2004/0016638 | A1* | 1/2004 | LaConti | H01M 8/0243 |
| | | | | 204/252 |
| 2010/0288629 | A1* | 11/2010 | LaConti | C25B 9/08 |
| | | | | 204/252 |
| 2011/0253699 | A1* | 10/2011 | Morin | H05B 3/145 |
| | | | | 219/387 |
| 2011/0253701 | A1* | 10/2011 | Morin | H05B 3/56 |
| | | | | 219/482 |
| 2011/0305974 | A1* | 12/2011 | Nakanishi | H01M 4/663 |
| | | | | 429/521 |
| 2015/0031855 | A1 | 1/2015 | Daugherty et al. | |
| 2016/0336602 | A1 | 11/2016 | Choi et al. | |
| 2017/0037522 | A1* | 2/2017 | Kaczur | C25B 9/08 |
| 2017/0054189 | A1* | 2/2017 | Park | H01M 12/08 |

FOREIGN PATENT DOCUMENTS

| | | |
|---|---|---|
| KR | 1020090047896 A | 5/2009 |
| KR | 1020130014650 A | 2/2013 |
| KR | 1020140022736 A | 2/2014 |
| KR | 1020150092180 A | 8/2015 |
| KR | 1020160066993 A | 6/2016 |
| KR | 1020170020162 A | 2/2017 |

\* cited by examiner

GAS DIFFUSION LAYER FOR METAL-AIR BATTERY, METAL-AIR BATTERY INCLUDING THE GAS DIFFUSION LAYER, AND METHOD OF MANUFACTURING THE METAL-AIR BATTERY

CROSS-REFERENCE TO RELATED APPLICATION

This application claims priority to and the benefit of Korean Patent Application No. 10-2017-0094966, filed on Jul. 26, 2017, in the Korean Intellectual Property Office, and all the benefits accruing therefrom under 35 U.S.C. § 119, the content of which is incorporated herein in its entirety by reference.

BACKGROUND

1. Field

The present disclosure relates to a gas diffusion layer for metal-air batteries, a metal-air battery including the gas diffusion layer, and a method of manufacturing the metal-air battery. More particularly, the present disclosure relates to a gas diffusion layer for metal-air batteries having an increased energy density, a metal-air battery including the gas diffusion layer, and a method of manufacturing the metal-air battery.

2. Description of the Related Art

Metal-air batteries include a negative electrode capable of absorbing/releasing ions and a positive electrode that uses oxygen from the air as an active material. In the metal-air batteries, reduction/oxidation of oxygen introduced from the outside occurs at the positive electrode, oxidation/reduction of a metal occurs at the negative electrode, and the chemical energy generated by these reactions is extracted as electrical energy. For example, the metal-air batteries absorb oxygen during discharging and release oxygen during charge. Since the metal-air batteries use oxygen from the atmosphere, the metal-air batteries may have dramatically-increased energy densities, compared to other types of secondary batteries. For example, the metal-air batteries may have an energy density that is several times greater than an energy density of lithium-ion batteries.

Moreover, since there is a low possibility of ignition of the metal-air batteries at an abnormally high temperature, the metal-air batteries have excellent stability. Also, since the metal-air batteries operate only by storing/releasing oxygen and do not use a heavy metal, the risk of causing environmental pollution is low. Due to such various advantages, much research has been conducted on metal-air batteries.

SUMMARY

Provided are a gas diffusion layer for metal-air batteries with increased energy density by reducing a weight per unit area of the gas diffusion layer, a metal-air battery including the gas diffusion layer, and a method of manufacturing the metal-air battery.

Additional aspects will be set forth in part in the description which follows and, in part, will be apparent from the description, or may be learned by practice of the presented embodiments.

According to an aspect of an embodiment, a metal-air battery includes at least one positive electrode layer, which is configured for using oxygen as an active material and includes a first surface and a second surface opposite the first surface; a gas diffusion layer on the first surface of the positive electrode layer and including a plurality of carbon fibers; an electrolyte layer on the second surface of the positive electrode layer; and a negative electrode metal layer on the electrolyte layer, wherein the positive electrode layer includes a plurality of grooves and portions of the plurality of carbon fibers are in the grooves.

An average depth of each of the plurality of grooves may be about 20% to about 60% of a diameter of each of the plurality of carbon fibers.

An average width of each of the plurality of grooves may be about 80% to about 100% of a diameter of a carbon fiber of the plurality of carbon fibers.

An average length of each of the plurality of grooves may be greater than or equal to about 3 millimeters An average distance between adjacent grooves of the plurality of grooves may be about 30 micrometers to about 1,000 micrometers.

A diameter of each of the plurality of carbon fibers may be about 5 micrometers to about 10 micrometers.

A weight per unit area of the gas diffusion layer may be less than or equal to about 0.5 milligrams per square centimeter.

The weight per unit area of the gas diffusion layer may be greater than or equal to about 0.007 milligrams per square centimeter.

The gas diffusion layer may include a first carbon fiber layer including a plurality of carbon fibers arranged on the positive electrode layer, and a second carbon fiber layer on the first carbon fiber layer and including a plurality of carbon fibers extending in a direction intersecting a direction in which each of the plurality of carbon fibers of the first carbon fiber layer extends.

The gas diffusion layer may be a single layer and may include a fold.

The gas diffusion layer may include a plurality of carbon fiber layers including a plurality of carbon fibers, and the plurality of carbon fiber layers may include less than or equal to four layers.

The gas diffusion layer may be partially on the positive electrode layer. The negative electrode metal layer, the electrolyte layer, and the positive electrode layer may be bent over the gas diffusion layer such that the positive electrode layer contacts three surfaces of the gas diffusion layer, and one surface of the gas diffusion layer may be exposed.

According to an aspect of an embodiment, a method of manufacturing a metal-air battery includes: arranging a plurality of carbon fibers on a first surface of a positive electrode layer, which is configured for using oxygen as an active material; pressing the plurality of carbon fibers toward the positive electrode layer such that portions of the plurality of carbon fibers are inserted into the first surface of the positive electrode layer to form grooves, to thereby form a gas diffusion layer; and providing an electrolyte layer on a second surface of the positive electrode layer and a negative electrode metal layer on the electrolyte layer to form the metal-air battery.

The pressing of the plurality of carbon fibers may include pressing the plurality of carbon fibers such that an average depth of the grooves is about 20% to about 60% of a diameter of a carbon fiber of the plurality of carbon fibers.

The pressing of the plurality of carbon fibers may include pressing the plurality of carbon fibers such that an average width of the grooves is about 80% to about 100% of a diameter of a carbon fiber of the plurality of carbon fibers.

The arranging of the plurality of carbon fibers may include arranging the plurality of carbon fibers such that an average distance between adjacent carbon fibers of the plurality of carbon fibers is about 30 micrometers to about 1,000 micrometers.

A weight per unit area of the gas diffusion layer may be less than or equal to about 0.5 milligrams per square centimeter.

The weight per unit area of the gas diffusion layer may be greater than or equal to about 0.007 milligrams per square centimeter.

According to an aspect of an embodiment, a gas diffusion layer includes a plurality of carbon fibers arranged on a first surface of a positive electrode layer which is configured for using oxygen as an active material, wherein portions of the plurality of carbon fibers are in the first surface of the positive electrode layer.

The gas diffusion layer may include no binders.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
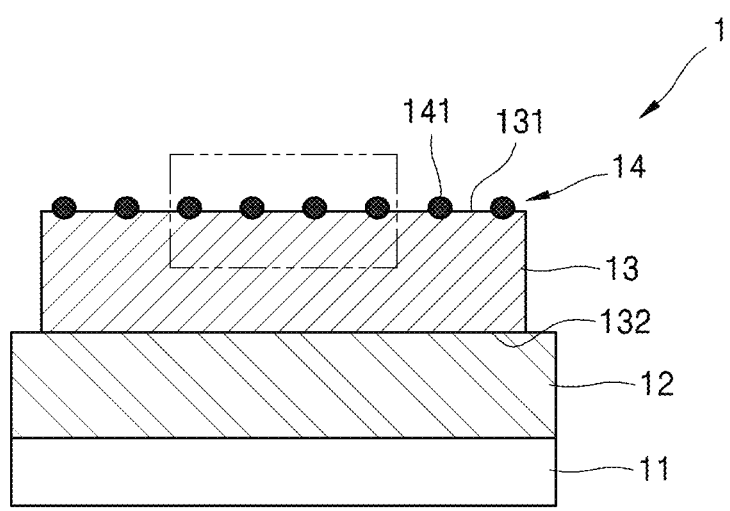
FIG. 1 is a cross-sectional view of an embodiment of a metal-air battery.

A gas diffusion layer for metal-air batteries, a metal-air battery, and a method of manufacturing the metal-air battery, according to an embodiment, will now be described in detail with reference to the accompanying drawings. Like reference numerals in the drawings denote like elements, and, in the drawings, the sizes or thicknesses of elements may be exaggerated for convenience of explanation. In this regard, embodiments below may have different forms and should not be construed as being limited to the descriptions set forth herein.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper", depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
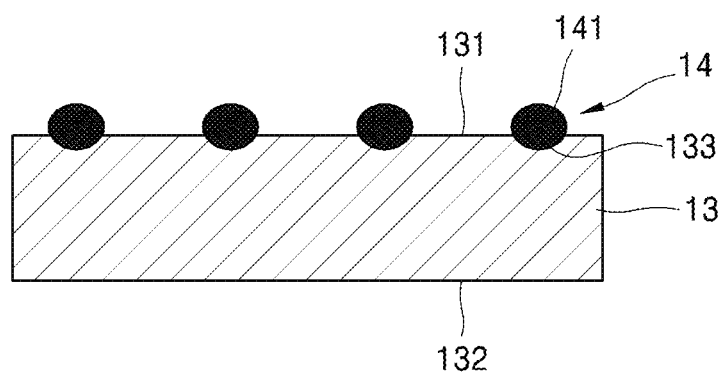
FIG. 2 is a magnified view of a portion of the gas diffusion layer of FIG. 1.
Figure 3:
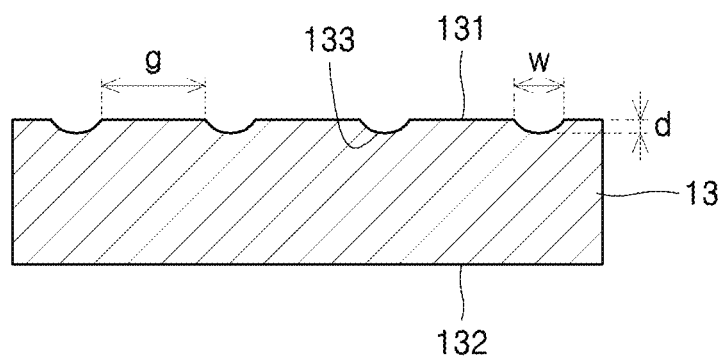
FIG. 3 is a cross-sectional view of the positive electrode layer of FIG. 2, in which the gas diffusion layer is omitted.
Figure 4A:
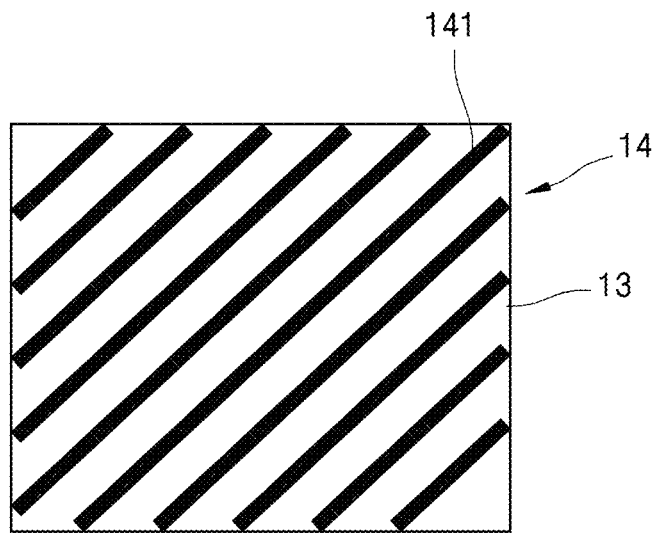
FIG. 4A is a plan view an embodiment of a gas diffusion layer.
Figure 4B:
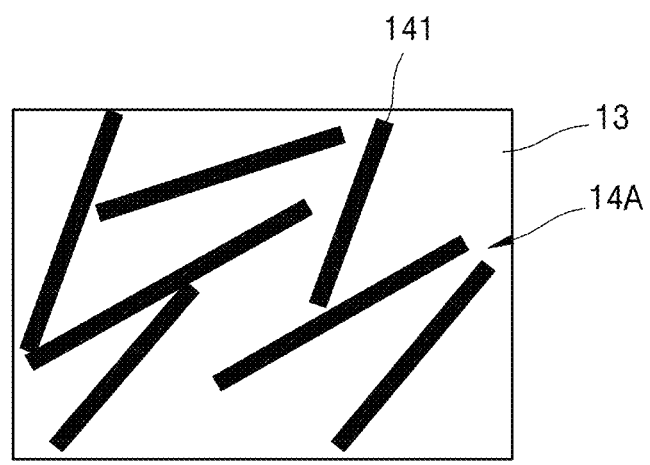
FIG. 4B is a plan view an embodiment of a gas diffusion layer.

FIG. 1 is a cross-sectional view of an embodiment of a metal-air battery 1. FIG. 2 is a magnified view of a portion of the gas diffusion layer 14 of FIG. 1. FIG. 3 is a cross-sectional view of the positive electrode layer 13 of FIG. 2, not including the gas diffusion layer 14. FIG. 4A is a plan view of an embodiment of a gas diffusion layer 14, and FIG. 4B is a plan view of an embodiment of a gas diffusion layer 14A.

Referring to FIG. 1, the metal-air battery 1 may have a two-dimensional ("2D") planar structure. For example, the metal-air battery 1 may be obtained by sequentially depositing a negative electrode metal layer 11, an electrolyte layer 12, a positive electrode layer 13, and the gas diffusion layer 14 for metal-air batteries (hereinafter, referred to as the gas diffusion layer 14). The metal-air battery 1 may further include an outer casing (not shown) that surrounds a portion of the metal-air battery 1 except for an upper surface of the gas diffusion layer 14.

The negative electrode metal layer 11 functions to absorb/release metal ions, and may include, for example, lithium (Li), sodium (Na), zinc (Zn), potassium (K), calcium (Ca), magnesium (Mg), iron (Fe), aluminum (Al), an alloy thereof, or a combination thereof.

The electrolyte layer 12 functions to transmit metal ions to the positive electrode layer 13. The electrolyte layer 12 may be referred to as a negative electrode electrolyte layer. To this end, the electrolyte layer 12 may include an electrolyte that is formed by dissolving a metal salt in a solvent. The electrolyte may be typically in a solid phase including a polymer-based electrolyte, an inorganic electrolyte, or a composite electrolyte obtained by mixing the polymer-based electrolyte with the inorganic electrolyte.

The electrolyte layer 12 may be prepared in a bent form. For example, the metal salt may be a lithium salt such as $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $LiN(SO_2CF_3)_2$, $LiC(SO_2CF_3)_3$, $LiN(SO_3CF_3)_2$, $LiC_4F_9SO_3$, $LiAlCl_4$, lithium bis(trifluoromethanesulfonyl)imide ("LiTFSI"), or a combination thereof.

Another metal salt, such as $AlCl_3$, $MgCl_2$, $NaCl$, $KCl$, $NaBr$, $KBr$, $CaCl_2$, or a combination thereof may be added to the lithium salt. The solvent may be any material as long as it may dissolve the lithium salt and the metal salt.

The electrolyte layer 12 may further include a separation layer that prevents transmission of oxygen and has conductivity with respect to the metal ions. The separation layer may be a polymer-based separation film that may be bent. For example, the separation layer may be formed of a polymer nonwoven fabric, such as a nonwoven fabric of polypropylene or a nonwoven fabric of polyphenylene sulfide, or a porous film of olefin-based resin, such as polyethylene or polypropylene. The separation layer and the electrolyte may be formed as separate layers, or the electrolytic layer 12 may be formed as one layer by impregnating pores of a porous separation layer with an electrolyte. For example, the electrolytic layer 12 may be formed by impregnating the pores of a porous separation layer with an electrolyte formed by mixing polyethylene oxide ("PEO") with LiTFSI.

The positive electrode layer 13 may include an electrolyte for conducting the metal ions, a catalyst for oxidizing/reducing oxygen, a conductive material, and a binder. For example, the positive electrode layer 13 may be formed by preparing a positive electrode slurry by mixing the electrolyte, the catalyst, the conductive material, and the binder, adding a solvent thereto, and coating and drying the positive electrode slurry on the electrolytic layer 12.

The electrolyte may include the lithium salt or the metal salt. For example, the conductive material may be a porous carbon-based material, a conductive metal material, a conductive organic material, or a combination thereof. For example, the carbon-based material may be carbon black, graphite, graphene, activated carbon, carbon fiber, carbon nanotubes, or a combination thereof. For example, the conductive metal material may be used in the form of metal powder. For example, the catalyst may be platinum (Pt), gold (Au), silver (Ag), or a combination thereof, or may be an oxide of manganese (Mn), nickel (Ni), cobalt (Co), or a combination thereof. The binder may be, for example, polytetrafluoroethylene ("PTFE"), polypropylene, polyvinylidene fluoride ("PVDF"), polyethylene, styrene-butadiene rubber, or a combination thereof.

The positive electrode layer 13 has a first surface 131 and a second surface 132 opposite the first surface 131. The gas diffusion layer 14 is disposed on the first surface 131 of the positive electrode layer 13, and the electrolyte layer 12 is disposed on the second surface 132.

The gas diffusion layer 14 functions to absorb oxygen from the atmosphere and supply the oxygen to the positive electrode layer 13. To this end, the gas diffusion layer 14 may have a structure for moving and diffusing external oxygen, e.g., smoothly moving and diffusing external oxygen. For example, the gas diffusion layer 14 may have a flow path structure.

The gas diffusion layer 14 may have conductivity. For example, the first thin film layer 141 may include a plurality of carbon fibers 141. Each of the plurality of carbon fibers 141 may include carbon as a main component and have a diameter of less than or equal to about 20 micrometers (μm). For example, each of the carbon fibers 141 may have a diameter of about 5 μm to about 10 μm.

The carbon fibers 141 may be referred to as graphite fibers. The carbon fibers 141 may be hollow carbon fibers.

Each of the carbon fibers 141 may have a length of greater than or equal to about 3 millimeters (mm). A length of the plurality of carbon fibers 141 may be less than or equal to about 1,000 mm or less.

The length of each of the carbon fibers 141 may be determined based on a length of the positive electrode layer 13 on which the gas diffusion layer 14 is disposed. For example, when the positive electrode layer 13 is long, long carbon fibers 141 may be used, and, when the positive electrode layer 13 is short, short carbon fibers 141 may be used.

A weight of the gas diffusion layer 14 may be less than or equal to about 19%, e.g., about 1% to about 19%, of an overall weight of the metal-air battery 1. To this end, the gas diffusion layer 14 according to an embodiment may include no binders. Since the gas diffusion layer 14 includes no binders, a weight per unit area, of the gas diffusion layer 14 may be reduced. For example, the weight per unit area of the gas diffusion layer 14 may be less than or equal to about 0.5 milligrams per square centimeter ($mg/cm^2$), e.g., about 0.007 $mg/cm^2$ to about 0.5 $mg/cm^2$.

As described above, because the gas diffusion layer 14 of the present application includes no binders, when the plurality of carbon fibers 141 are arranged on the first surface 131 of the positive electrode layer 13 without any special actions, the plurality of carbon fibers 141 may not be fixed to the positive electrode layer 13 and may become scattered or move during the manufacture of the gas diffusion layer 14.

Considering this point, referring to FIGS. 2 and 3, in the metal-air battery 1 according to an embodiment, respective portions of the plurality of carbon fibers 141 may be inserted into the positive electrode layer 13 such that the plurality of carbon fibers 141 may be fixed to the positive electrode layer 13. Accordingly, the positive electrode layer 13 may have insertion grooves 133 into which the respective portions of the carbon fibers 141 are inserted. Due to this insertion of the respective portions of the carbon fibers 141 of the gas diffusion layer 14 into the insertion grooves 133 of the positive electrode layer 13, the gas diffusion layer 14 may be fixed to the positive electrode layer 13.

The insertion grooves 133 of the positive electrode layer 13 may have depths, widths, lengths, and gaps that enable the carbon fibers 141 of the gas diffusion layer 14 to be fixed to the positive electrode layer 13 and also enable oxygen to be sufficiently supplied and diffused.

For example, an average depth d of the insertion grooves 133 may be about 20% to about 60% of a diameter of a carbon fiber of the plurality of carbon fibers 141 or each of the carbon fibers 141. When each of the carbon fibers 141 has a diameter of about 7 μm, each of the insertion grooves 133 may have an average depth d of greater than or equal to about 1.4 μm.

For example, an average width w of the insertion grooves 133 may be about 80% to about 100% of the diameter of a carbon fiber of the plurality of carbon fibers 141 or each of the carbon fibers 141. An average length of each of the insertion grooves 133 may be greater than or equal to about 3 mm. An average gap g between adjacent insertion grooves of the plurality of insertion grooves 133 may be about 30 μm to about 1,000 μm. The gas diffusion layer 14 may include a first space occupied by the carbon fibers 141, and a second space in which no carbon fibers 141 are arranged and oxygen gas is movable and diffusible. A ratio of the second space to the gas diffusion layer 14 may be about 80% to about 99%.

The gas diffusion layer 14 may have a single layer structure. For example, the plurality of carbon fibers 141 may be arranged on the positive electrode layer 13 to form a single layer.

Referring to FIG. 4A, the plurality of carbon fibers 141 extend in a uniform direction and may be spaced apart from each other. However, the arrangement of the plurality of carbon fibers 141 is not limited thereto, and the plurality of carbon fibers 141 may be arranged in various manners. For example, as shown in FIG. 4B, the plurality of carbon fibers 141 of the gas diffusion layer 14 extend in various directions and may be arranged to be at least partially spaced apart from each other.

As described above, even when the gas diffusion layers 14 and 14A include no binders, the plurality of carbon fibers 141 are inserted into the insertion grooves 133 of the positive electrode layer 13 and fixed to the positive electrode layer 13, and thus the weight per unit area may be reduced to less than or equal to about 0.5 $mg/cm^2$, e.g., about 0.007 $mg/cm^2$ to about 0.5 $mg/cm^2$, and an energy density of the metal-air battery 1 may be increased.

However, when the weight per unit area of the gas diffusion layer 14 becomes too small, a voltage loss due to a resistance in ohms may increase to the extent of affecting the efficiency of the metal-air battery 1.

Figure 5:
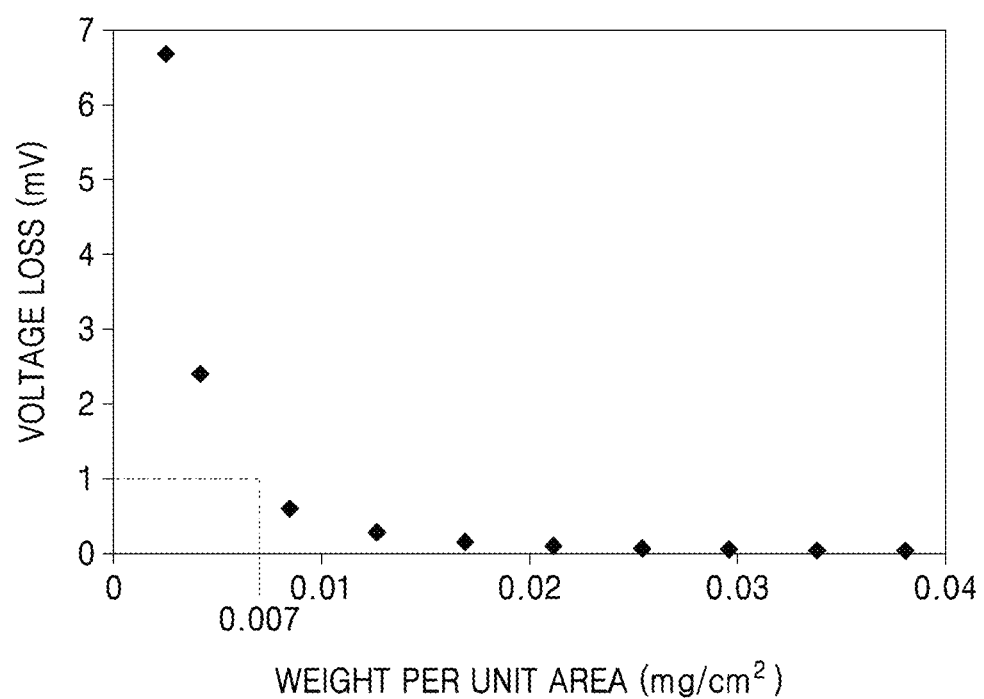
FIG. 5 is a graph showing a voltage loss (mV) versus a weight per unit area ($mg/cm^2$) of the gas diffusion layer.

FIG. 5 is a graph showing a voltage loss versus a weight per unit area of the gas diffusion layer 14. Referring to FIG. 5, when the weight per unit area of the gas diffusion layer 14 decreases to a certain value or less, the voltage loss increases sharply. Accordingly, considering this sharp increase in the voltage loss, the gas diffusion layer 14 according to an embodiment may have a weight per unit area of greater than or equal to about 0.007 $mg/cm^2$ so that a voltage loss due to a resistance in ohms is less than or equal to about 1 millivolt (mV).

Figure 6:
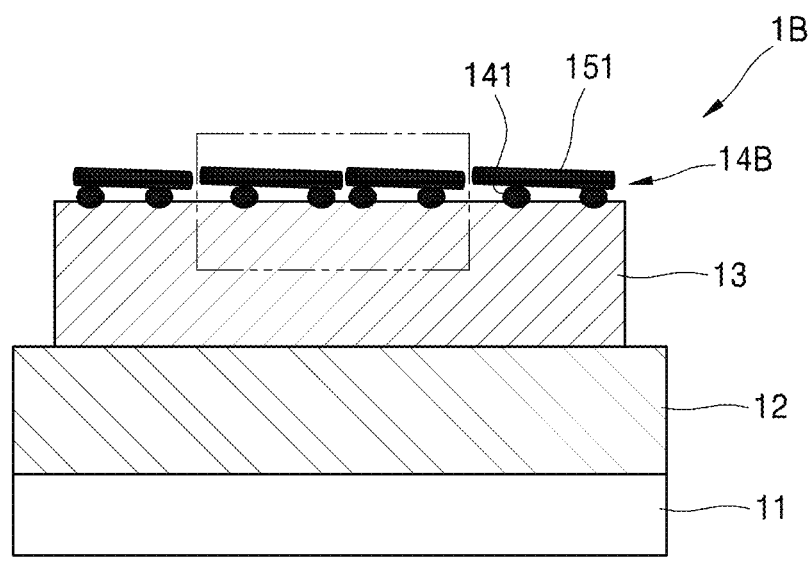
FIG. 6 is a cross-sectional view of an embodiment of a metal-air battery.
Figure 7:
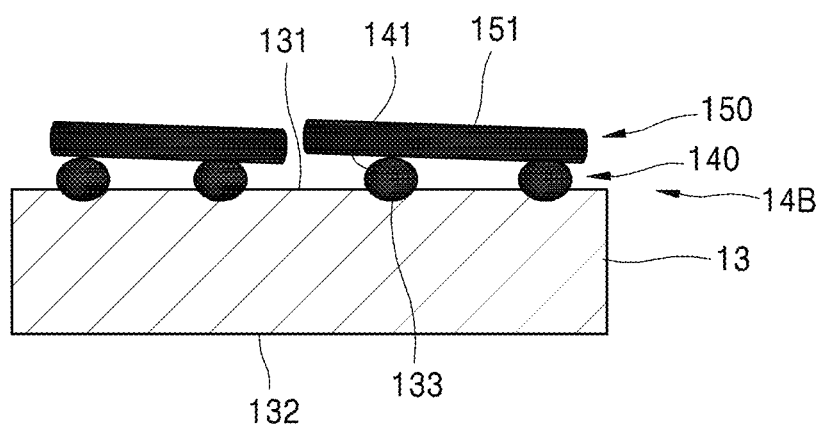
FIG. 7 is a magnified view of a portion of the gas diffusion layer of FIG. 6.
Figure 8A:
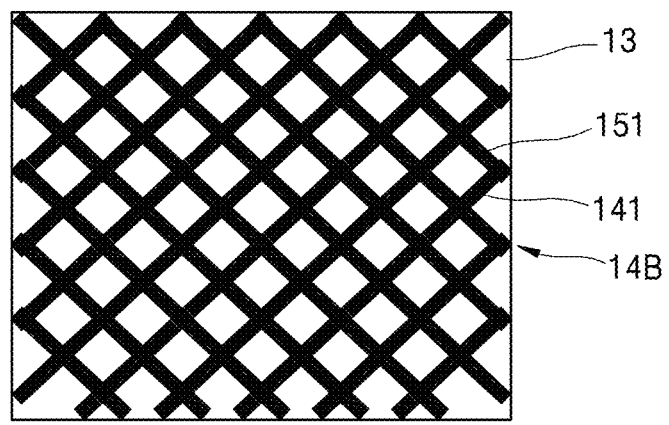
FIG. 8A is a plan view of an embodiment of a gas diffusion layer.
Figure 8B:
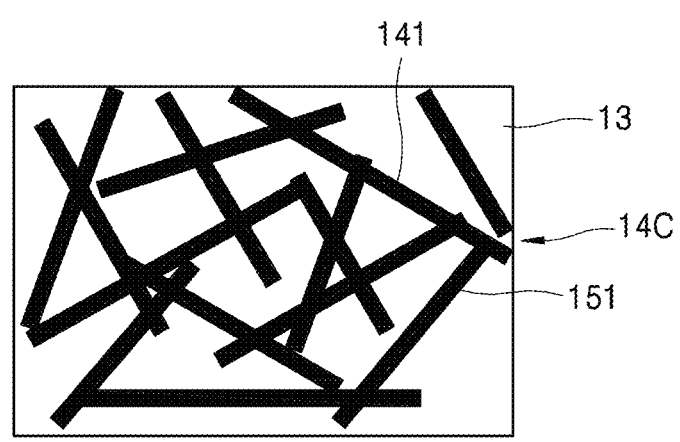
FIG. 8B is a plan view of an embodiment of a gas diffusion layer.

FIG. 6 is a cross-sectional view of an embodiment of a metal-air battery 1B. FIG. 7 is a magnified view of a portion of the gas diffusion layer 14B of FIG. 6. FIG. 8A is a plan view of an embodiment of a diffusion layer 14B, and FIG. 8B is a plan view of an embodiment of a gas diffusion layer 14C.

Referring to FIGS. 6 and 7, the metal-air battery 1B may include the negative electrode metal layer 11, the electrolyte layer 12, the positive electrode layer 13, and the gas diffusion layer 14B. The same component as that in the previous embodiments uses the same reference numeral, and a redundant description thereof will be omitted here.

The gas diffusion layer 14B has a two-layer structure, and carbon fiber layers 140 and 150 may include a plurality of carbon fibers 141 and a plurality of carbon fibers 151, respectively. Each of the carbon fiber layers 140 and 150 include no binders. In the gas diffusion layer 14B having a two-layer structure, the plurality of carbon fibers 141 and 151 may be arranged in a lattice shape. For example, the gas diffusion layer 14B may include a first carbon fiber layer 140 in which respective portions of the plurality of carbon fibers 141 are inserted into the insertion grooves 133 of the first surface 131, and a second carbon fiber layer 150 in which the plurality of carbon fibers 151 extend on the first carbon fiber layer 140 in a direction intersecting with a direction in which each of the carbon fibers 141 of the first carbon fiber layer 140 extends.

For example, as shown in FIG. 8A, the gas diffusion layer 14B may include the carbon fiber layers 140 and 150 of which the plurality of carbon fibers 141 and the plurality of carbon fibers 151 are arranged in respective uniform directions. As another example, as shown in FIG. 8B, the gas diffusion layer 14C may include carbon fiber layers 140 and 150 of which the plurality of carbon fibers 141 and 151 are arranged in various directions.

Although the carbon fibers 151 of the second carbon fiber layer 150 are spaced apart from the positive electrode layer 13 in FIG. 7, embodiments are not limited thereto. For example, although not shown in the drawings, respective portions of the carbon fibers 151 of the second carbon fiber layer 150 may be arranged on the carbon fibers 141 of the first carbon fiber layer 140 and are thus not inserted into the positive electrode layer 13, whereas other portions of the carbon fibers 151 of the second carbon fiber layer 150 may be inserted into portions of the positive electrode layer 13 that is exposed and between the carbon fibers 141 of the first carbon fiber layer 140, e.g., portions of the positive electrode layer 13 not covered by the carbon fibers 141 of the first carbon fiber layer 140.

Each of the gas diffusion layers 14B and 14C may have a layer structure of two or less layers. If each of the gas diffusion layers 14B and 14C has a layer structure of three or more layers, because there are no binders for fixing the carbon fibers 141 and 151 to each other, carbon fibers 141 and 151 forming three or more layers are not inserted into the positive electrode layer 13, and thus may not be fixed thereto. On the other hand, if each of the gas diffusion layers 14B and 14C has a layer structure of two or less layers, even when there are no binders for fixing the carbon fibers 141 and 151 to each other, carbon fibers 141 and 151 forming two or less layers may be inserted into the positive electrode layer 13 and thus may be supported thereby.

Figure 9:
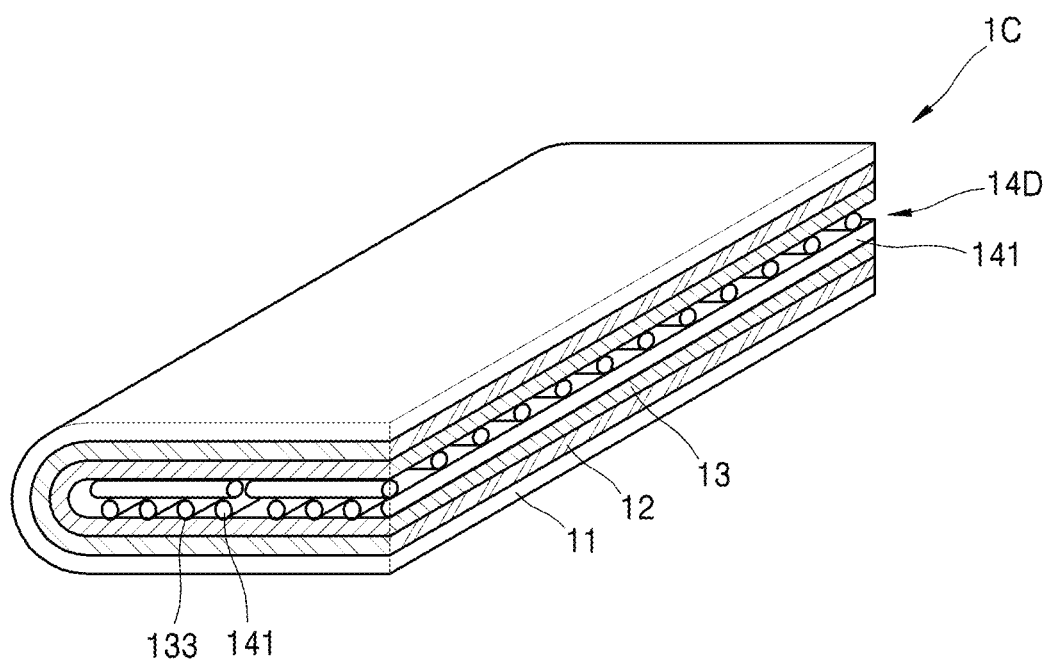
FIG. 9 is a perspective view of an embodiment of a metal-air battery.
Figure 10A:
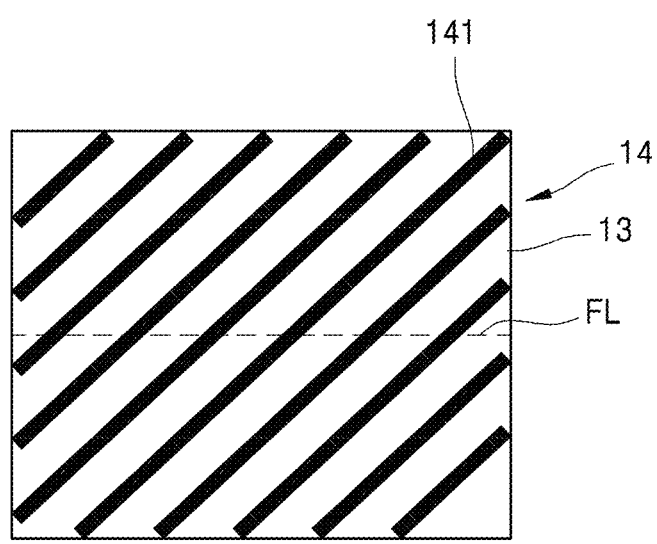
FIG. 10A is a plan view of an embodiment of a gas diffusion layer.
Figure 10B:
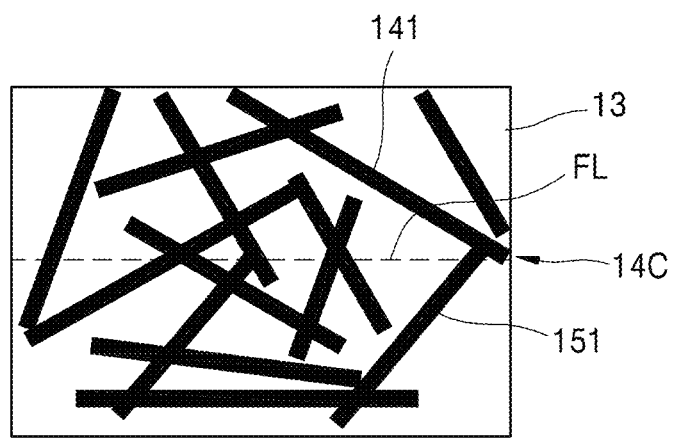
FIG. 10B is a plan view of an embodiment of a gas diffusion layer.
Figure 10C:
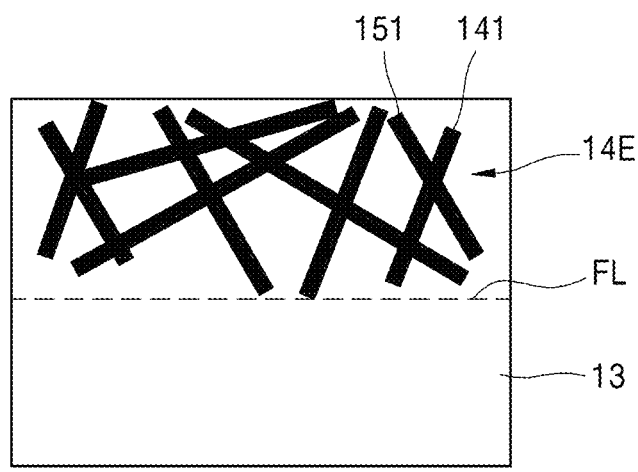
FIG. 10C is a plan view of an embodiment of a gas diffusion layer.

FIG. 9 is a perspective view of an embodiment of a metal-air battery 10. FIG. 10A is a plan view of an embodiment of a gas diffusion layer 14, FIG. 10B is a plan view of an embodiment of a gas diffusion layer 14C, and FIG. 10O is a plan view of an embodiment of a gas diffusion layer 14E.

Referring to FIG. 9, the metal-air battery 10 may include the negative electrode metal layer 11, the electrolyte layer 12, the positive electrode layer 13, and a gas diffusion layer 14D. The same component as that in the previous embodiments uses the same reference numeral, and a redundant description thereof will be omitted here.

The metal-air battery 10 may have a three-dimensional (3D) shape. In the metal-air battery 10, the negative electrode metal layer 11, the electrolyte layer 12, and the positive electrode layer 13 may be bent.

For example, referring to FIG. 10A, the gas diffusion layer 14 may have a one-layer structure in which the plurality of carbon fibers 141 are arranged on the positive electrode layer 13. Respective portions of the carbon fibers 141 may be inserted into the insertion grooves 133 of the positive electrode layer 13. The gas diffusion layer 14 is bent along a bending line FL to thereby form the gas diffusion layer 14D of a structure in which both ends of the gas diffusion layer 14D face each other as shown in FIG. 9. The bent gas diffusion layer 14D may have a two-layer structure.

As another example, referring to FIG. 10B, the gas diffusion layer 14C may include the first carbon fiber layer 140, on which the plurality of carbon fibers 141 are arranged on the positive electrode layer 13, and the second carbon fiber layer 150, on which the plurality of carbon fibers 151 are arranged on the first carbon fiber layer 140. The carbon fibers 141 of the first carbon fiber layer 140 may intersect with the carbon fibers 151 of the second carbon fiber layer 150. The gas diffusion layer 14C is bent along the bending line FL to thereby form the gas diffusion layer 14D of a structure in which both ends of the gas diffusion layer 14D face each other. The bent gas diffusion layer 14D may have a layer structure of four or less layers.

As another example, referring to FIG. 10O, the gas diffusion layer 14E may be disposed on a portion of the positive electrode layer 13. The negative electrode metal layer 11, the electrolyte layer 12, and the positive electrode layer 13 are bent over the gas diffusion layer 14E such that the positive electrode layer 13 contacts three surfaces of the gas diffusion layer 14, and one surface of the gas diffusion layer 14E may be exposed. The gas diffusion layer 14E may have a layer structure of two or less layers.

Figure 11A:
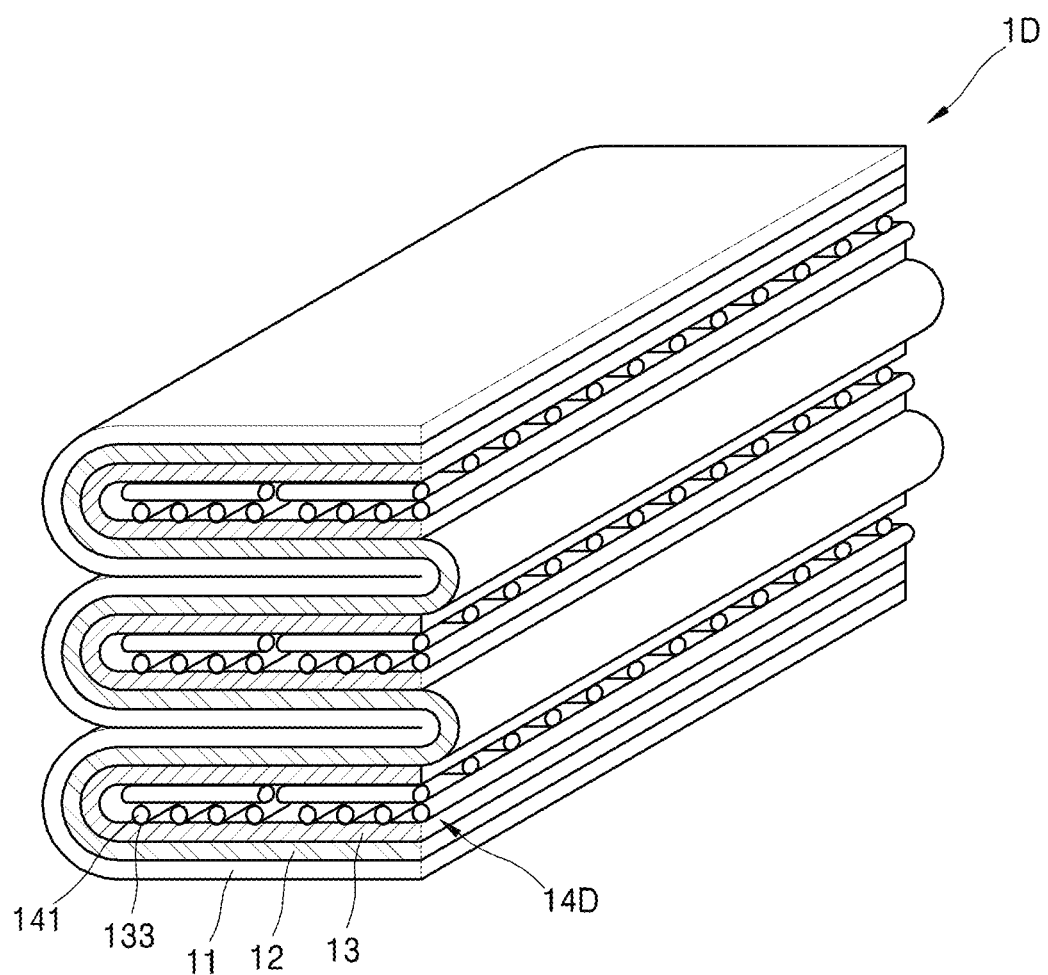
FIGS. 11A and 11B are perspective views of embodiments of metal-air batteries.
Figure 11B:
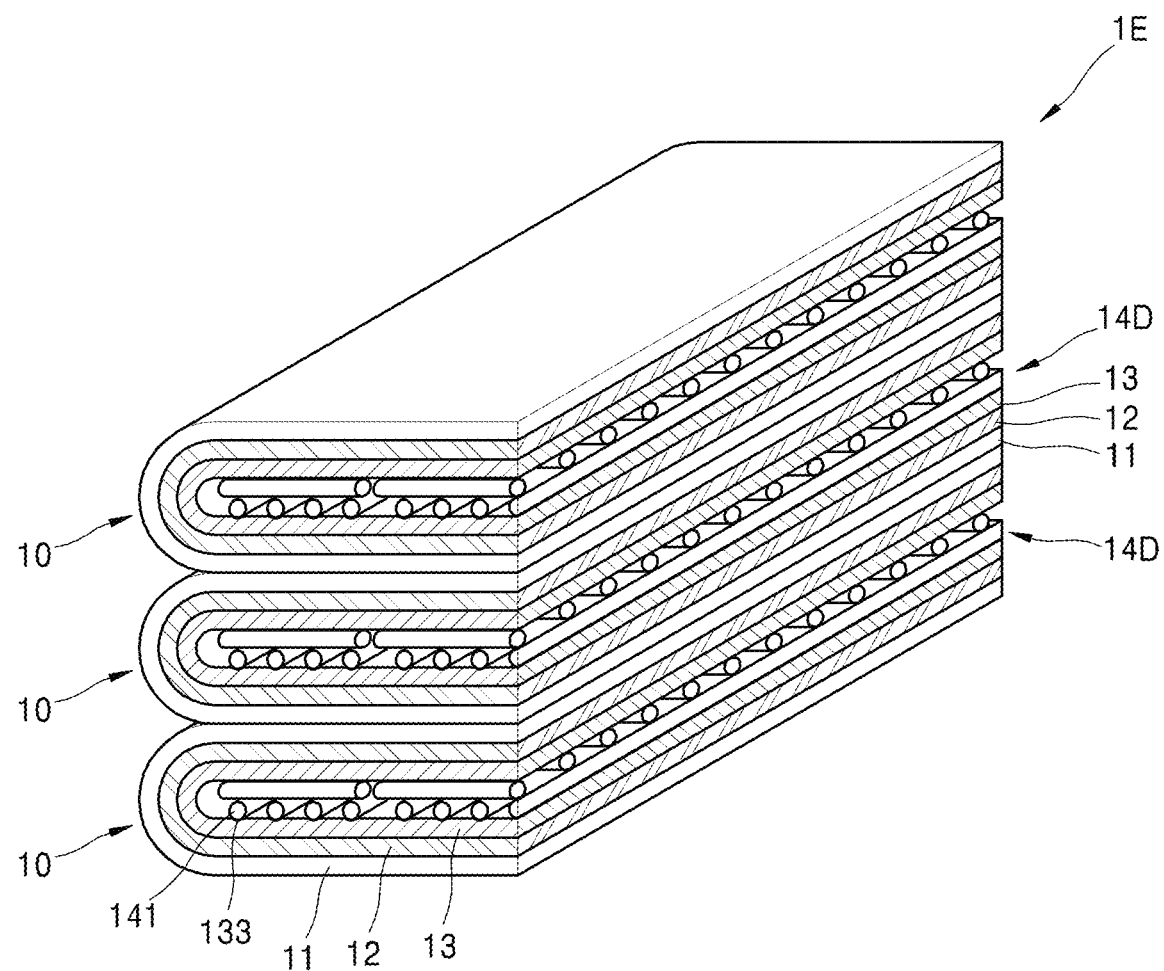

In the above-described embodiments, a structure in which a single gas diffusion layer 14D is included and the negative electrode metal layer 11, the electrolyte layer 12, and the positive electrode layer 13 are bent once has been illustrated as the metal-air battery 10 having a 3D shape. However, the metal-air battery 10 having a 3D shape is not limited thereto and may be variously modified. For example, as shown in FIG. 11A, a metal-air battery 1D may include a plurality of gas diffusion layers 14D, and may have a structure in which the negative electrode metal layer 11, the electrolyte layer 12, and the positive electrode layer 13 are bent multiple times. As another example, as shown in FIG. 11B, a metal-air battery 1E may have a structure in which a plurality of battery cells 10 are arranged vertically, each battery cell 10 has a single gas diffusion layer 14D, and the negative electrode metal layer 11, the electrolyte layer 12, and the positive electrode layer 13 are bent once for each battery cell 10.

Figure 12:
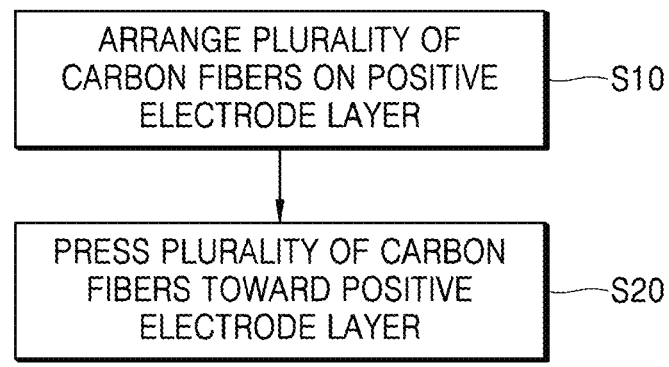
FIG. 12 is a flowchart of an embodiment of a method of manufacturing a metal-air battery.
Figure 13A:
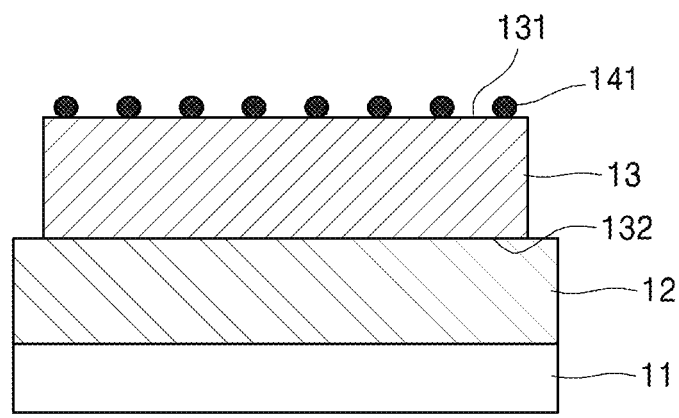
FIGS. 13A and 13B are cross-sectional views of an embodiment of a method of manufacturing the metal-air battery.
Figure 13B:
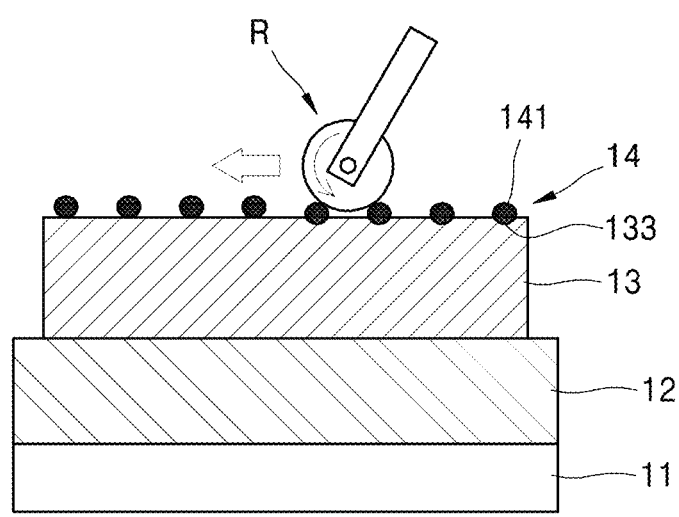

FIG. 12 is a flowchart of a method of manufacturing the metal-air battery 1, according to an embodiment. FIGS. 13A and 13B are cross-sectional views of an embodiment of a method of manufacturing the metal-air battery 1.

Referring to FIGS. 12 and 13A, first, a plurality of carbon fibers 141 are arranged on the first surface 131 of the positive electrode layer 13, in operation S10. The plurality of carbon fibers 141 may be sprayed onto the first surface 131 of the positive electrode layer 13. The plurality of carbon fibers 141 may be arranged such that the average gap, e.g., distance, between adjacent carbon fibers of the plurality of carbon fibers 141 is about 30 µm to about 1,000 µm.

Each of the plurality of carbon fibers 141 may include carbon as a main component, and have a diameter of less than or equal to about 20 µm. For example, each carbon fiber 141 may have a diameter of about 5 µm to about 10 µm.

The carbon fibers 141 may be referred to as graphite fibers. The carbon fibers 141 may be hollow carbon fibers.

Each of the carbon fibers 141 may have a length of greater than or equal to about 3 mm. A length of the plurality of carbon fibers 141 may be less than or equal to about 1,000 mm.

The length of each of the carbon fibers 141 may be determined based on a length of the positive electrode layer 13. For example, when the positive electrode layer 13 is long, long carbon fibers 141 may be used, and, when the positive electrode layer 13 is short, short carbon fibers 141 may be used.

Referring to FIGS. 12 and 13B, when the plurality of carbon fibers 141 are arranged on one surface of the positive electrode layer 13, the plurality of carbon fibers 141 are pressed toward the positive electrode layer 13, in operation S20. Due to the pressing, respective portions of the plurality of carbon fibers 141 may be inserted into the first surface 131 of the positive electrode layer 13. Accordingly, a plurality of insertion grooves 133 into which the respective portions of the carbon fibers 141 have been inserted may be formed on the positive electrode layer 13.

For example, the carbon fibers 141 arranged on one surface of the positive electrode layer 13 may be pressed by a rotatable roller R and thus may be stuck into the positive electrode layer 13. The plurality of carbon fibers 141 may be sequentially pressed by rotating and moving the roller R.

The plurality of carbon fibers 141 of the gas diffusion layer 14 may be pressed such that the carbon fibers 141 are fixable to the positive electrode layer 13.

The carbon fibers 141 may be pressed toward the positive electrode layer 13 such that the average depth of the insertion grooves 133 is about 20% to about 60% of the diameter of a carbon fiber of the plurality of carbon fibers 141 or each of the carbon fibers 141. The carbon fibers 141 may be pressed toward the positive electrode layer 13 such that the average width of the insertion grooves 133 is about 80% to about 100% of the diameter of a carbon fiber of the plurality of carbon fibers 141 or each of the carbon fibers 141.

As described above, the plurality of carbon fibers 141 are arranged such that respective portions thereof are inserted into the positive electrode layer 13, and thus the gas diffusion layer 14 supported by one surface of the positive electrode layer 13 may be formed.

As such, because the gas diffusion layer 14 includes the conductive carbon fibers 141 but uses, e.g., includes, no binders, the weight per unit area of the gas diffusion layer 14 may be minimized. For example, the weight per unit area of the gas diffusion layer 14 may be less than or equal to about 0.5 mg/cm$^2$. However, considering the voltage loss due to a resistance in ohms, the weight per unit area of the gas diffusion layer 14 may be greater than or equal to about 0.007 mg/cm$^2$.

In the above-described embodiment, a method of fixing the gas diffusion layer 14 onto the positive electrode layer 13 has been described by focusing on the method of manufacturing the metal-air battery 1 having a 2D planar structure. However, the fixing method is not limited thereto, and may be applied to methods of manufacturing the metal-air batteries 1B, 1C, 1D, and 1E having various structures. For example, the 3D metal-air batteries 10, 1D, and 1E each having a bent structure may be manufactured by bending the gas diffusion layer 14 supported by the positive electrode layer 13 due to pressing of the plurality of carbon fibers 141, the positive electrode layer 13, the electrolyte layer 12, and the negative electrode metal layer 11.

Figure 14:
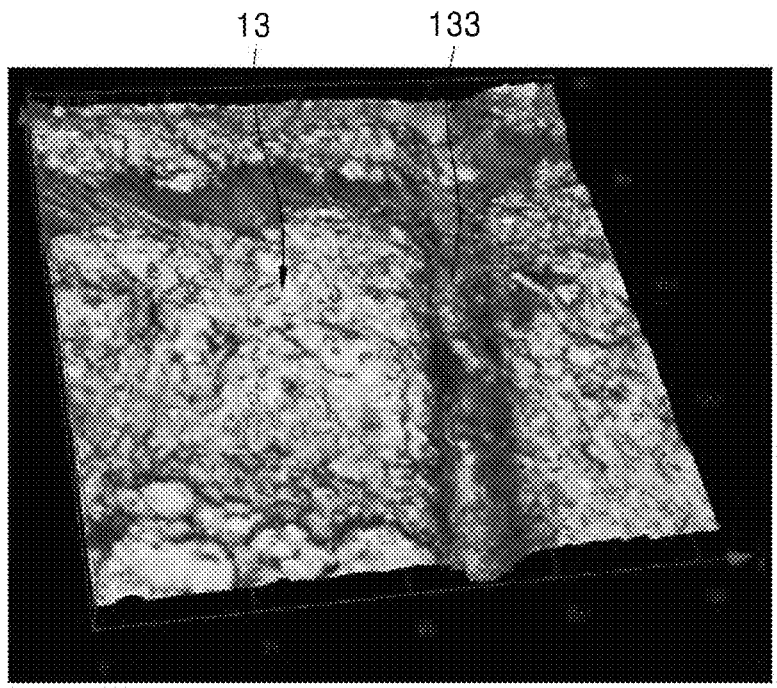
FIG. 14 is an electron microscope view of an embodiment of a positive electrode layer manufactured in the method of manufacturing the metal-air battery.

FIG. 14 is an electron microscope view of the positive electrode layer 13 manufactured in the method of manufacturing the metal-air battery 1.

Referring to FIG. 14, it may be seen that the insertion grooves 133 are formed in a surface of the positive electrode layer 13. The insertion grooves 133 may be distinguished from fine grooves generated during the manufacture of the positive electrode layer 13. A depth of each of the insertion groove 133 may be greater than or equal to about 1.4 μm. According to an embodiment, the depth of each of the insertion groove 133 may be greater than or equal to about 4 μm.

The disclosed embodiment will be described in more detail via the embodiments described below and comparative examples. However, the embodiments below are intended to exemplify the present disclosure, and the scope of the present disclosure is not limited thereto.

EXAMPLES

Manufacture of Lithium-Air Battery

Comparative Example 1: Manufacture of Comparative Lithium-Air Battery

Manufacture of Positive Electrode Layer

Carbon nanotubes, a PTFE binder, and a positive electrode electrolyte solution were weighed at a certain weight ratio and then mechanically kneaded, and a result of the kneading was manufactured to have a certain thickness by a roll press and then dried for two hours in an oven of 80° C., thereby manufacturing a rectangular positive electrode layer. A weight per unit area of the positive electrode layer was 2.7 milligrams per square centimeter (mg/cm$^2$).

Manufacture of Electrolyte Layer

A separation layer was coated with a poly(diallyldimethylammonium-bis (trifluoromethanesulfonyl)imide) ("PIL") solution including electrolyte and then vacuum-dried (at 60° C. and for 6 hours) such that a solvent is removed from the separation layer, to thereby obtaining a solid electrolyte layer. A weight per unit area of the electrolyte layer was 2.7 mg/cm$^2$.

Manufacture of Lithium-Air Battery

The electrolyte layer was disposed on one surface of the positive electrode layer, and a lithium metal as a negative electrode metal layer was disposed on one surface of the electrolyte layer.

No gas diffusion layers were disposed on the positive electrode layer, and, as shown in FIG. 9, the positive electrode layer, the electrolyte layer, and the negative electrode metal layer were bent to manufacture a lithium-air battery.

The manufactured lithium-air battery has a structure in which cells are respectively arranged on an upper portion and a lower portion with respect to a bent center portion. Because a single cell has a horizontal length of 3 centimeters (cm), a vertical length of 1 cm, and an area of 3 square centimeters (cm$^2$), an overall cell area of the lithium-air battery is 6 cm$^2$ (=3 cm×1 cm×2).

Comparative Example 2: Manufacture of Comparative Lithium-Air Battery

A lithium-air battery according to Comparative Example 2 was manufactured the same as the lithium-air battery according to Comparative Example 1, except that a gas diffusion layer was disposed within a bent positive electrode layer.

The lithium-air battery according to Comparative Example 2 was manufactured by disposing a gas diffusion layer on a positive electrode layer and then bending the positive electrode layer, an electrolyte layer, and a negative electrode metal layer as shown in FIG. 9 such that the positive electrode layer surrounds at least three surfaces of the gas diffusion layer. At this time, a carbon paper having a weight per unit area of 4.2 mg/cm$^2$ was used as the gas diffusion layer.

Embodiment 1: Manufacture of Lithium-Air Battery

Manufacture of Positive Electrode Layer

The positive electrode layer was manufactured using the same method as that used in Comparative Example 1.

Manufacture of Electrolyte Layer

The electrolyte layer was manufactured using the same method as that used in Comparative Example 1.

Manufacture of Gas Diffusion Layer

A plurality of carbon fibers (graphite fibers by Fibre Glast) having a length of 0.25 inches and a diameter of 7 μm are arranged on the positive electrode layer.

The plurality of carbon fibers arranged on the positive electrode layer are pressed with a certain pressure. Thus, the plurality of carbon fibers are inserted into and fixed to insertion grooves of the positive electrode layer.

The gas diffusion layer is fixed to the positive electrode layer without using binders, and has a weight per unit area of 0.2 mg/cm².

Manufacture of Lithium-Air Battery

The lithium-air battery according to Embodiment 1 was manufactured by disposing the gas diffusion layer on the positive electrode layer as in Comparative Example 2 and then bending the positive electrode layer, the electrolyte layer, and the negative electrode metal layer as shown in FIG. 9 such that the positive electrode layer surrounds at least three surfaces of the gas diffusion layer.

Embodiment 2: Manufacture of Lithium-Air Battery

The lithium-air battery according to Embodiment 2 was manufactured the same as the lithium-air battery according to Embodiment 1, except for a weight per unit area of a gas diffusion layer. In the lithium-air battery according to Embodiment 2, the gas diffusion layer is fixed to a positive electrode layer without using binders, and has a weight per unit area of 0.05 mg/cm².

Embodiment 3: Manufacture of Lithium-Air Battery

The lithium-air battery according to Embodiment 3 was manufactured the same as the lithium-air battery according to Embodiment 1, except for a weight per unit area of a gas diffusion layer. In the lithium-air battery according to Embodiment 3, the gas diffusion layer is fixed to a positive electrode layer without using binders, and has a weight per unit area of 0.03 mg/cm².

Evaluation of Charging and Discharging Characteristics

Figure 15:
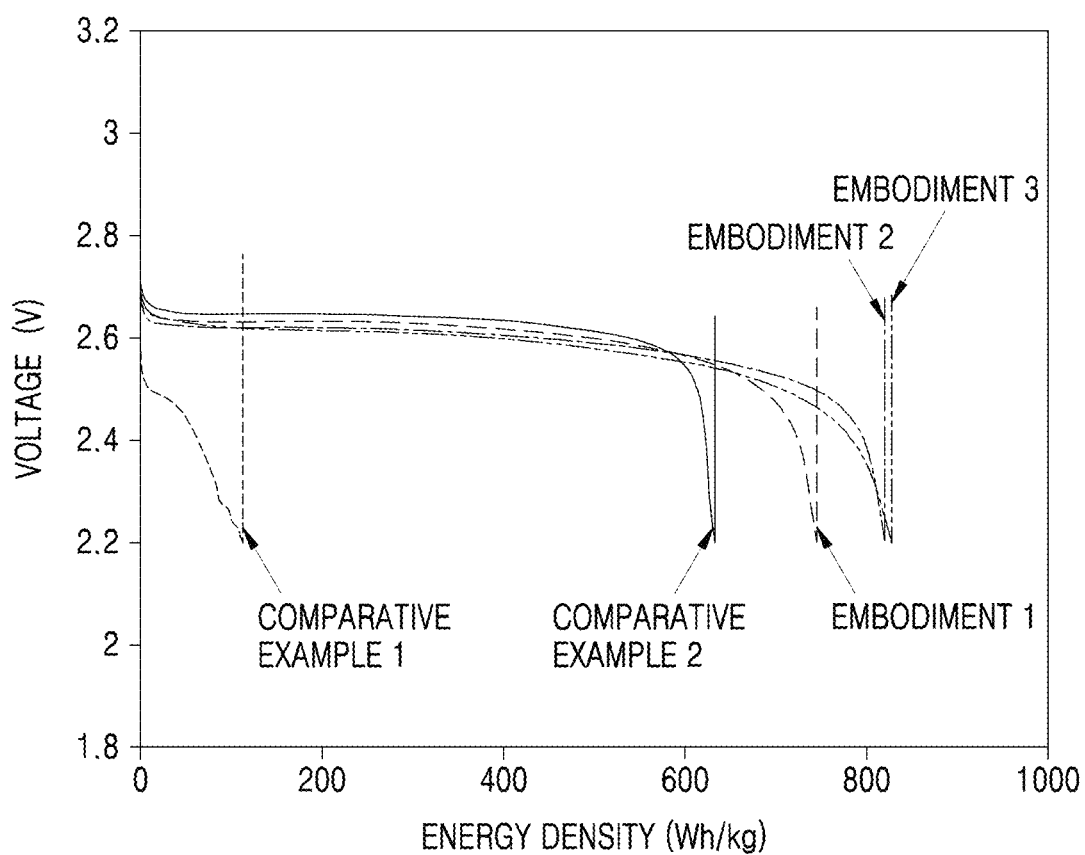
FIG. 15 is a graph showing voltage (V) versus energy density (Wh/kg) of metal-air batteries according to Comparative Examples 1 and 2 and Embodiments 1, 2, and 3.

Discharge capacities of the lithium-air batteries manufactured according to Embodiment 1 and Comparative Example 1 were measured at 80° C. under a 1 atmosphere (atm) oxygen atmosphere, and a result of the measurement was shown in Table 1 and FIG. 15.

Because each of the lithium-air batteries has a once-bent structure in which a positive electrode is disposed on an upper portion and a lower portion of a gas diffusion layer, a weight per unit area of the gas diffusion layer was calculated by respectively allocating halves of the weight per unit area to an upper positive electrode and a lower positive electrode.

TABLE 1

| | Shape of gas diffusion layer | Weight per unit area (mg/cm²) | Energy density (Wh/kg) |
|---|---|---|---|
| Comparative Example 1 | none | 0 | 112 |
| Comparative Example 2 | Carbon paper | 2.1 | 632 |
| Embodiment 1 | Carbon fibers (no binders) | 0.2 | 744 |
| Embodiment 2 | Carbon fibers (no binders) | 0.05 | 820 |
| Embodiment 3 | Carbon fibers (no binders) | 0.03 | 827 |

As shown in Table 1, compared with the lithium-air battery having no gas diffusion layers according to Comparative Example 1, the lithium-air battery having a gas diffusion layer according to Comparative Example 2 has an increased energy density but has an increased weight per unit area of 2.1 mg/cm² due to the presence of the gas diffusion layer.

In contrast with the lithium-air battery according to Comparative Example 2, the lithium-air battery according to Embodiment 1 uses carbon fibers without binders as a gas diffusion layer. Thus, the weight per unit area of the gas diffusion layer may be reduced to less than or equal to about ¹⁄₁₀ of the weight per unit area of the gas diffusion layer according to Comparative Example 2, and the energy density may be increased.

Moreover, in the lithium-air batteries according to Embodiments 2 and 3, the weight per unit area of the gas diffusion layer may be less than the weight per unit area of the gas diffusion layer of Embodiment 1 and the energy density may be greater than the energy density of Embodiment 1.

As described above, according to a gas diffusion layer for metal-air batteries, a metal-air battery including the gas diffusion layer, and a method of manufacturing the metal-air battery, according to an embodiment, respective portions of carbon fibers are inserted into and fixed to a positive electrode layer in order to include no binders. Therefore, the weight per unit area of the gas diffusion layer may be reduced, and accordingly, the energy density of the metal-air battery may be increased.

While the present invention has been particularly shown and described with reference to the example embodiments thereof, it will be understood by those of ordinary skill in the art that various changes in form and details may be made therein. Therefore, the scope of the present disclosure should be determined by the accompanying claims.

What is claimed is:

1. A metal-air battery comprising:
    at least one positive electrode layer, which is configured for using oxygen as an active material and comprises a first surface and a second surface opposite the first surface;
    a gas diffusion layer on the first surface of the positive electrode layer and comprising a plurality of carbon fibers;
    an electrolyte layer on the second surface of the positive electrode layer; and
    a negative electrode metal layer on the electrolyte layer,
    wherein the positive electrode layer comprises a plurality of grooves formed in the first surface,
    wherein portions of the plurality of carbon fibers are in the grooves, and
    wherein the portions of the plurality of carbon fibers extends in a substantially same direction in which the grooves extend.

2. The metal-air battery of claim 1, wherein an average depth of the plurality of grooves is about 20% to about 60% of a diameter of a carbon fiber of the plurality of carbon fibers.

3. The metal-air battery of claim 1, wherein an average width of the plurality of grooves is about 80% to about 100% of a diameter of a carbon fiber of the plurality of carbon fibers.

4. The metal-air battery of claim 1, wherein an average length of each of the plurality of grooves is greater than or equal to about 3 millimeters.

5. The metal-air battery of claim 1, wherein an average distance between adjacent grooves of the plurality of grooves is about 30 micrometers to about 1,000 micrometers.

6. The metal-air battery of claim 1, wherein a diameter of each of the plurality of carbon fibers is about 5 micrometers to about 10 micrometers.

7. The metal-air battery of claim 1, wherein a weight per unit area of the gas diffusion layer is less than or equal to about 0.5 milligrams per square centimeter.

8. The metal-air battery of claim 7, wherein the weight per unit area of the gas diffusion layer is greater than or equal to about 0.007 milligrams per square centimeter.

9. A metal-air battery comprising:
- at least one positive electrode layer, which is configured for using oxygen as an active material and comprises a first surface and a second surface opposite the first surface;
- a gas diffusion layer on the first surface of the positive electrode layer and comprising a plurality of carbon fibers;
- an electrolyte layer on the second surface of the positive electrode layer; and
- a negative electrode metal layer on the electrolyte layer,
- wherein the positive electrode layer comprises a plurality of grooves formed in the first surface,
- wherein portions of the plurality of carbon fibers are in the grooves, and
- wherein the gas diffusion layer comprises:
    - a first carbon fiber layer comprising a plurality of carbon fibers arranged on the positive electrode layer, and
    - a second carbon fiber layer on the first carbon fiber layer and comprising a plurality of carbon fibers extending in a direction intersecting a direction in which each of the plurality of carbon fibers of the first carbon fiber layer extends.

10. A metal-air battery comprising:
- at least one positive electrode layer, which is configured for using oxygen as an active material and comprises a first surface and a second surface opposite the first surface;
- a gas diffusion layer on the first surface of the positive electrode layer and comprising a plurality of carbon fibers;
- an electrolyte layer on the second surface of the positive electrode layer; and
- a negative electrode metal layer on the electrolyte layer,
- wherein the positive electrode layer comprises a plurality of grooves formed in the first surface,
- wherein portions of the plurality of carbon fibers are in the grooves, and
- wherein the gas diffusion layer is a single layer and comprises a fold.

11. The metal-air battery of claim 10, wherein the gas diffusion layer comprises a plurality of carbon fiber layers comprising a plurality of carbon fibers, and the plurality of carbon fiber layers comprises less than or equal to four layers.

12. A metal-air battery comprising:
- at least one positive electrode layer, which is configured for using oxygen as an active material and comprises a first surface and a second surface opposite the first surface;
- a gas diffusion layer on the first surface of the positive electrode layer and comprising a plurality of carbon fibers;
- an electrolyte layer on the second surface of the positive electrode layer; and
- a negative electrode metal layer on the electrolyte layer,
- wherein the positive electrode layer comprises a plurality of grooves formed in the first surface,
- wherein portions of the plurality of carbon fibers are in the grooves,
- wherein the gas diffusion layer is partially on the positive electrode layer, and
- wherein the negative electrode metal layer, the electrolyte layer, and the positive electrode layer are bent over the gas diffusion layer such that the positive electrode layer contacts at least three surfaces of the gas diffusion layer, and a first surface of the gas diffusion layer is exposed.

13. A method of manufacturing a metal-air battery, the method comprising:
- arranging a plurality of carbon fibers on a first surface of a positive electrode layer, which is configured for using oxygen as an active material;
- pressing the plurality of carbon fibers toward the positive electrode layer such that portions of the plurality of carbon fibers are inserted into the first surface of the positive electrode layer to form grooves, to thereby form a gas diffusion layer; and
- providing an electrolyte layer on a second surface of the positive electrode layer and a negative electrode metal layer on the electrolyte layer to form the metal-air battery of claim 1,
- wherein the grooves extend in a substantially same direction in which the portions of the plurality of carbon fibers extends.

14. The method of claim 13, wherein the pressing of the plurality of carbon fibers comprises pressing the plurality of carbon fibers such that an average depth of the grooves is about 20% to about 60% of a diameter of a carbon fiber of the plurality of carbon fibers.

15. The method of claim 13, wherein the pressing of the plurality of carbon fibers comprises pressing the plurality of carbon fibers such that an average width of the grooves is about 80% to about 100% of a diameter of a carbon fiber of the plurality of carbon fibers.

16. The method of claim 13, wherein the arranging of the plurality of carbon fibers comprises arranging the plurality of carbon fibers such that an average distance between adjacent carbon fibers of the plurality of carbon fibers is about 30 micrometers to about 1,000 micrometers.

17. The method of claim 13, wherein a weight per unit area of the gas diffusion layer is less than or equal to about 0.5 milligrams per square centimeter.

18. The method of claim 17, wherein the weight per unit area of the gas diffusion layer is greater than or equal to about 0.007 milligrams per square centimeter.

19. A gas diffusion layer comprising:
- a plurality of carbon fibers arranged on a first surface of a positive electrode layer which is configured for using oxygen as an active material,
- wherein portions of the plurality of carbon fibers are in grooves formed in the first surface of the positive electrode layer,
- wherein the portions of the plurality of carbon fibers extends in a substantially same direction in which the grooves extend.

20. The gas diffusion layer of claim 19, wherein the gas diffusion layer does not comprise a binder.

* * * * *